(12) United States Patent
Röttig et al.

(10) Patent No.: US 8,816,883 B2
(45) Date of Patent: *Aug. 26, 2014

(54) METHOD AND SYSTEM FOR GPS BASED NAVIGATION AND HAZARD AVOIDANCE IN A MINING ENVIRONMENT

(75) Inventors: Andree Röttig, Olinda (BR); Mario Leonel Rearte, La Serena (CL); Paulo Rogério Andrade, Recife (BR)

(73) Assignee: Modular Mining Systems, Inc., Tucson, AZ (US)

( * ) Notice: Subject to any disclaimer, the term of this patent is extended or adjusted under 35 U.S.C. 154(b) by 228 days.

This patent is subject to a terminal disclaimer.

(21) Appl. No.: 13/323,350

(22) Filed: Dec. 12, 2011

(65) Prior Publication Data

US 2012/0081237 A1 Apr. 5, 2012

Related U.S. Application Data

(63) Continuation of application No. 11/849,963, filed on Sep. 4, 2007, now Pat. No. 8,095,248.

(51) Int. Cl.
*G08G 1/123* (2006.01)

(52) U.S. Cl.
USPC ........................... 340/988; 702/2; 342/357.25

(58) Field of Classification Search
USPC ........... 340/988; 73/146; 37/348, 415; 701/2, 701/30, 50, 209, 301; 348/211.3; 463/42; 709/219; 726/27; 707/705; 342/357.25
See application file for complete search history.

(56) References Cited

U.S. PATENT DOCUMENTS

| | | | |
|---|---|---|---|
| 5,557,278 A | 9/1996 | Piccirillo et al. |
| 5,650,770 A | 7/1997 | Schlager et al. |
| 5,724,040 A | 3/1998 | Watnick |
| 5,786,750 A | 7/1998 | Cooper |
| 5,963,130 A | 10/1999 | Schlager et al. |
| 5,983,161 A | 11/1999 | Lemelson et al. |

(Continued)

FOREIGN PATENT DOCUMENTS

| | | |
|---|---|---|
| GB | 2421828 | 7/2006 |
| WO | WO9605562 | 2/1996 |

(Continued)

OTHER PUBLICATIONS

Rottig, Andree et al., "Proximity Detection", WorldCoal, Aug. 2006; pp. 51-53, vol. 15, No. 8, World Coal, Palladian Publications Limited, England.

*Primary Examiner* — John A Tweel, Jr.
(74) *Attorney, Agent, or Firm* — Quarles & Brady LLP (57) ABSTRACT

A system and method for GPS based navigation and hazard avoidance in a mining environment are described. The system includes a central application that has a dynamic roadmap definition module adapted to at least allow a user to arbitrarily define features in a geographical information systems database and import overhead imaging data corresponding to a geographical area in which said features are defined. The central application includes a remote position and attitude reception module adapted to at least receive data concerning the position of at least one remote vehicle, a transceiver module adapted for exchanging data with at least one remote vehicle; and a logging and tracking module adapted for at least logging said position of at least one remote vehicle over time. The system also has a remote application; and a communications link adapted for exchanging data between the central application and the remote application.

18 Claims, 4 Drawing Sheets

(56) References Cited

U.S. PATENT DOCUMENTS

| | | | |
|---|---|---|---|
| 5,987,379 | A | 11/1999 | Smith |
| 6,084,510 | A | 7/2000 | Lemelson et al. |
| 6,104,979 | A | 8/2000 | Fowler et al. |
| 6,198,390 | B1 | 3/2001 | Schlager et al. |
| 6,219,618 | B1 | 4/2001 | Bateman |
| 6,275,773 | B1 | 8/2001 | Lemelson et al. |
| 6,292,725 | B1 | 9/2001 | Kageyama et al. |
| 6,317,058 | B1 | 11/2001 | Lemelson et al. |
| 6,363,321 | B1 | 3/2002 | Fowler et al. |
| 6,393,362 | B1 | 5/2002 | Burns |
| 6,456,941 | B1 | 9/2002 | Gutierrez |
| 6,487,500 | B2 | 11/2002 | Lemelson et al. |
| 6,643,579 | B1 | 11/2003 | Gutierrez |
| 6,741,187 | B2 | 5/2004 | Flick |
| 6,816,089 | B2 | 11/2004 | Flick |
| 6,862,521 | B1 | 3/2005 | Fox |
| 6,941,201 | B2 | 9/2005 | Sudou |
| 7,047,114 | B1 | 5/2006 | Rogers |
| 7,092,801 | B2 | 8/2006 | Kane et al. |
| 7,433,889 | B1 | 10/2008 | Barton |
| 8,095,248 | B2 * | 1/2012 | Rottig et al. ............... 701/2 |
| 2002/0008637 | A1 | 1/2002 | Lemelson et al. |
| 2002/0022927 | A1 | 2/2002 | Lemelson et al. |
| 2002/0032511 | A1 | 3/2002 | Murakami et al. |
| 2002/0101365 | A1 | 8/2002 | Flick |
| 2002/0133294 | A1 | 9/2002 | Farmakis et al. |
| 2002/0138200 | A1 | 9/2002 | Gutierrez |
| 2003/0115020 | A1 | 6/2003 | Adachi et al. |
| 2004/0083035 | A1 | 4/2004 | Ellis |
| 2004/0107042 | A1 | 6/2004 | Seick |
| 2004/0145457 | A1 | 7/2004 | Schofield et al. |
| 2004/0145496 | A1 | 7/2004 | Ellis |
| 2005/0131645 | A1 | 6/2005 | Panopoulos |
| 2005/0140524 | A1 | 6/2005 | Kato et al. |
| 2005/0156717 | A1 | 7/2005 | Flick |
| 2005/0192860 | A1 | 9/2005 | Kouda et al. |
| 2006/0047630 | A1 | 3/2006 | Furuno et al. |
| 2006/0106534 | A1 | 5/2006 | Kawamata et al. |
| 2007/0030156 | A1 | 2/2007 | Schlager et al. |
| 2007/0124078 | A1 | 5/2007 | Vinje |
| 2007/0202861 | A1 | 8/2007 | Adachi et al. |
| 2008/0059055 | A1 | 3/2008 | Geelen et al. |
| 2008/0091525 | A1 | 4/2008 | Kretz |
| 2008/0162043 | A1 | 7/2008 | Emoto et al. |
| 2008/0177469 | A1 | 7/2008 | Geelen et al. |
| 2008/0275639 | A1 | 11/2008 | Yun |
| 2008/0319659 | A1 | 12/2008 | Horvitz et al. |
| 2009/0023456 | A1 | 1/2009 | Seacat et al. |
| 2009/0037099 | A1 | 2/2009 | Joshi |
| 2009/0048767 | A1 | 2/2009 | Vaughn |
| 2009/0076725 | A1 | 3/2009 | Bhogal et al. |
| 2009/0093955 | A1 | 4/2009 | Geelen |
| 2011/0249118 | A1 * | 10/2011 | Bruno ............... 701/2 |

FOREIGN PATENT DOCUMENTS

| | | |
|---|---|---|
| WO | WO9613819 | 5/1996 |
| WO | WO9726634 | 7/1997 |
| WO | WO0051360 | 8/2000 |
| WO | WO03060830 | 7/2003 |

* cited by examiner

METHOD AND SYSTEM FOR GPS BASED NAVIGATION AND HAZARD AVOIDANCE IN A MINING ENVIRONMENT

CROSS-REFERENCE TO RELATED APPLICATIONS

This application is a continuation of, claims priority to, and incorporates herein by reference U.S. patent application Ser. No. 11/849,963 filed on Sep. 4, 2007, now U.S. Pat. No. 8,095,248 and entitled "METHOD AND SYSTEM FOR GPS BASED NAVIGATION AND HAZARD AVOIDANCE IN A MINING ENVIRONMENT."

BACKGROUND OF THE INVENTION

The invention relates to global positioning system ("GPS") based systems for controlling the navigation of vehicles in a mining environment.

Mining environments, and open pit mining environments in particular, are characterized by two features that are significant to navigation. First, the allowable routes for navigation in a mining environment are constantly changing. Equipment is routed into and out of the mining environment along different routes that can change on a daily or even an hourly basis depending on where material is being removed at a particular time. The location of allowable routes, whether the routes are one-way or two-way, the day-to-day existence of ramps to allow passage from one mining level to another, and whether a particular area is open or closed all change rapidly on the basis of mine operations. Adding to the challenge of navigating in the dynamic mining environment is the fact that there may be few physical visual cues that a driver in a mining environment can consistently rely on to determine where the driver can drive. In a conventional city street environment routes are defined by paved roads, curbs, painted lines and traffic signals. In a city street environment, then the user of GPS assisted navigation usually only needs a high level abstract visual representation of the city street environment to be oriented. Routes in a mining environment, on the other hand, may not be obvious as they can be ad hoc, constantly shifting, and are often destroyed in the course of day-to-day material removal operations.

The second feature significant to navigation in a mining environment is the presence of hazards distributed throughout the mine. A partial list of navigation hazards includes mobile heavy equipment such has shovels, bulldozers and material removal trucks, unstable slopes or surfaces, low points where water collects or bogs, high voltage power lines for delivering electricity to mining equipment, and areas where explosives are being used. Hazards, like allowable routes, change on a daily or hour-by-hour basis in a mining environment.

Given the hazardous and dynamic nature of the mine environment, it would be helpful to establish a system for dynamic definition of a road map system, including a spatial definition of the presence of hazards that could be dynamically forwarded to navigation systems embedded in vehicles. Due to the ad hoc nature of routes in a mining environment, it would be useful to present the driver of a vehicle in a mining environment with a visual representation of the dynamically defined road map system including representations of hazards superimposed on a real overhead image of the environment. Such a navigation and hazard avoidance system could incorporate additional useful features such as establishing speed limits across the dynamically defined road map system and alerting drivers when those speed limits are approached or exceeded. Additionally, such a navigation and hazard avoidance system could provide for tracking of vehicles in a mining environment and use such tracking information to improve routing efficiency, detect vehicle misuse, or reconstruct accidents.

Systems and methods of providing navigation data, including map data, and collision and hazard avoidance using GPS are known at various levels in the art. For example, U.S. Pat. No. 6,487,500 B2 to Lemelson et al. describes a system that uses GPS systems on vehicles, augmented by more accurate position sensors, to alert a vehicle operator of hazards in the operator's vicinity, including other vehicles. U.S. Pat. No. 7,047,114 B1 to Rogers et al. describes a hazard warning system for marine vessels. The Rogers system takes GPS position and data information from marine vessels and forwards to those vessels hazard alerts based on the positions of other vessels as well as fixed and semi-fixed hazards derived from nautical charts. U.S. Pat. No. 5,963,130 to Schlager et al. describes a personal alarm system that alerts an individual when the individual nears hazards that are detected by a local device. U.S. Patent Application No. 2004/0145496 describes a network that tracks and provides information regarding the whereabouts of various objects in a street network including vehicles and individuals. UK Patent Application GB 2421828 describes a traffic management hazard management system located on a vehicle that includes map data and location data obtained from a GPS receiver.

SUMMARY OF THE INVENTION

Objects and advantages of the invention are achieved by the preferred embodiments that are set forth in more detail below.

One aspect of the invention includes a navigation and hazard avoidance system. The system has a central application that has a dynamic roadmap definition module adapted to at least allow a user to arbitrarily define features in a geographical information systems database and import overhead imaging data corresponding to a geographical area in which said features are defined. The central application also includes a remote position and attitude reception module adapted to at least receive data concerning a position of at least one remote vehicle, a transceiver module adapted for exchanging data with at least one remote vehicle; and a logging and tracking module adapted for at least logging said position of at least one remote vehicle over time. The system also has a remote application; and a communications link adapted for exchanging data between the central application and the remote application.

In another aspect of the invention a navigation and hazard avoidance system has features that are defined in the geographical information systems database include at least one of routes, route attributes, hazards, and points of interest.

In another aspect of the navigation and hazard avoidance system has features that include the location and type of hazards, and at least two radii around the hazards representing varying levels of threat.

In another aspect of the invention the navigation and hazard avoidance system has a remote application that has a position sensor adapted to calculate the position of at least one remote vehicle based on triangulation from Global Positioning System satellites. The remote application also has a position tracker adapted to receive, from a central application, with features defined in the geographical information systems database and overhead imaging data corresponding to the geographical area in which the features are defined. The remote application also has a navigation aid adapted to display the position of at least one remote vehicle with respect to features defined in the geographical information systems database and with respect to overhead imaging data corresponding to the geographical area in which features are defined.

In another aspect of the invention, the navigation and hazard avoidance system has a position tracker that is adapted to transmit the position of a remote vehicle to the central application. In another aspect of the invention, the navigation and hazard avoidance system has features that are defined in a geographical information systems database and include hazards.

In another aspect of the invention, the navigation and hazard avoidance system has a remote application that has a violation manager adapted for determining whether the remote vehicle is close to a hazard.

In another aspect of the invention, the navigation and hazard avoidance system has a remote application that is adapted for alerting a central application when a vehicle is close to a hazard.

In another aspect of the invention, the navigation and hazard avoidance system has features defined in a geographical information systems database that include routes and route speed limits.

In another aspect of the invention, the navigation and hazard avoidance system includes a remote application that includes a violation manager adapted for determining whether a remote vehicle is near or has exceeded a route speed limit.

In another aspect of the invention, the navigation and hazard avoidance system has a remote application that is adapted for alerting a central application when a vehicle is near or has exceeded a route speed limit.

Still further aspects of the invention include methods or systems such as are set forth above that are implemented on computer readable media.

DETAILED DESCRIPTION OF THE INVENTION

Figure 1:
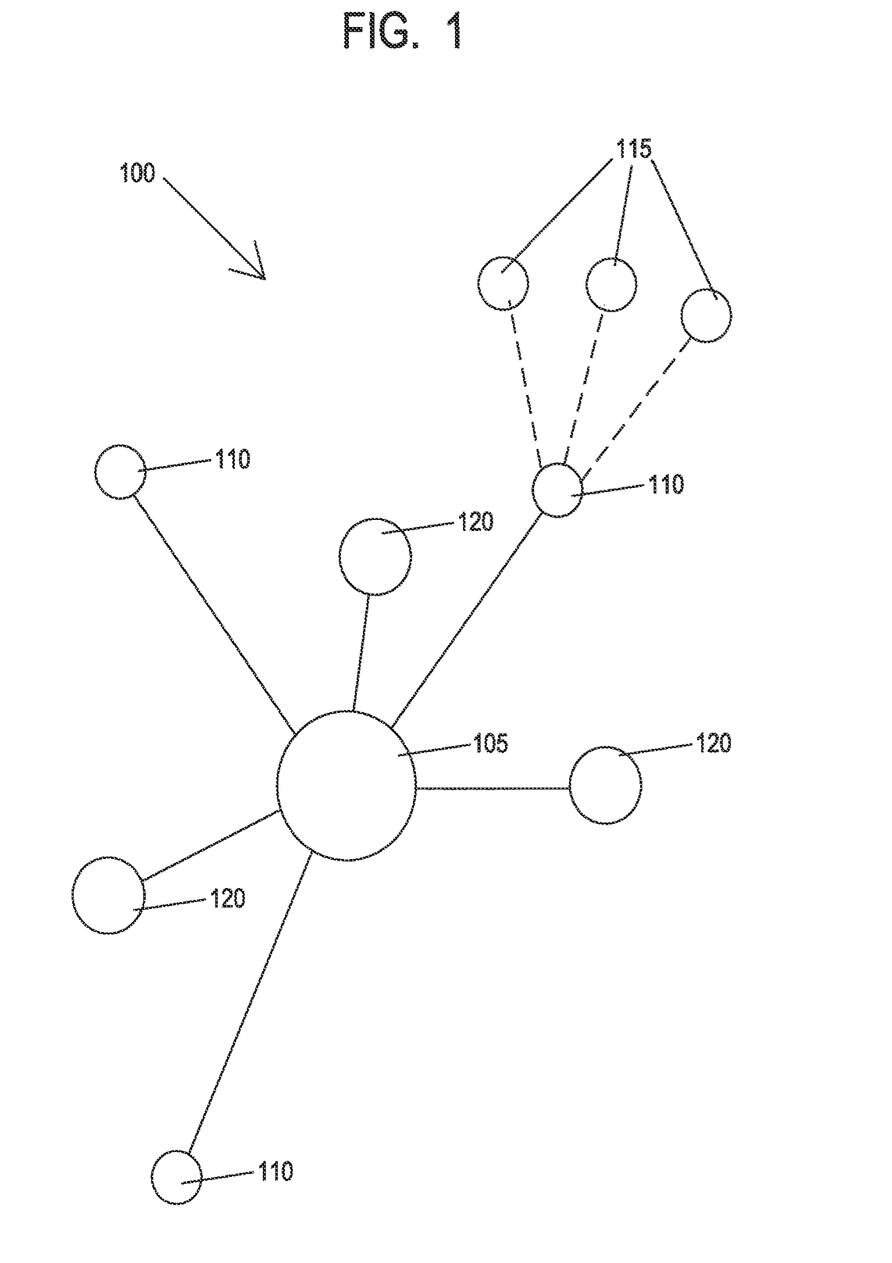
FIG. 1 shows a schematic representation of a network of applications according to the invention.

FIG. 1 shows a network 100 of functional nodes arranged according to the invention. A central node 105 is arranged to communicate with remote mobile nodes 110 and remote semi-static nodes 120. The central node 105 includes an application that runs at least partially on central physically stationary computer. The central node 105 may also optionally include certain functions such as processing or storage that are distributed among multiple computers that communicate as part of a local, wide area or global network.

The mobile nodes 110 include applications that run on computers or other data processing devices located in vehicles, for example light vehicles that can be found in a mining environment such as pickup trucks. The applications included in the mobile nodes 110 are optionally included in a personal data assistant ("PDA") accessible by the driver of a vehicle, but can also be included in a laptop, smart phone, or other programmable data device. The mobile nodes 110 communicate with the central node 105 by using a data capable radio link such as a WiFi 802.g or 802.n or equivalent. The link between a mobile node 110 and a central node 105 will generally only be required to operate over typical distances found in a mining environment, which are small when compared to, for example, larger city or suburban environments.

Semi-static nodes 120 include applications that run on computers or other data processing devices located in semi-static or slow moving objects, for example heavy mine equipment. A piece of earth moving equipment like a shovel that might remain relatively stationary at a particular work area might house a semi-static node. Semi-static nodes 120 also communicate with the central node 105 by using a data capable radio link such as a WiFi 802.g or 802.n or equivalent.

Both the mobile nodes 110 and the semi-static nodes 120 receive signals from a plurality of Global Positioning System (GPS) satellites 115, which allow the determination of the latitude and longitude of the vehicles or equipment housing the respective node.

Figure 2:
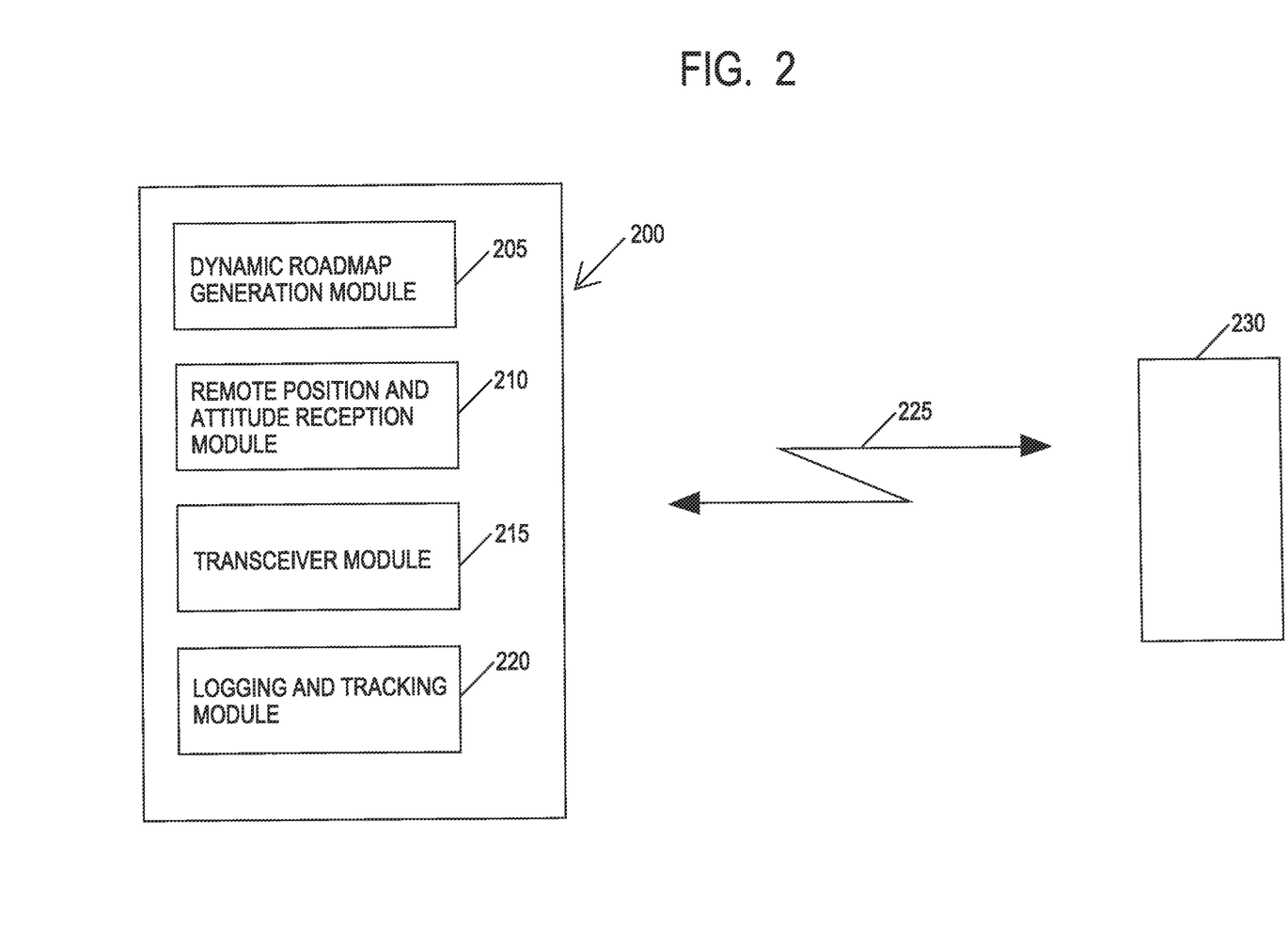
FIG. 2 shows the relationship between a central application and a remote application according to the present invention.

FIG. 2 illustrates how a system according to the invention maintains a central application 200 that communicates via a communications link 225 with at least one local application 230.

The central application 200 includes at least four modules: a dynamic roadmap generation module 205; a remote position and attitude reception module 210, a transceiver module 215 and a logging and tracking module 220.

The dynamic roadmap generation module 205 allows for a user to arbitrarily define features in a geographical information systems (GIS) database. The arbitrarily defined features can include accepted areas of travel, or routes, as well as route attributes such as speed limits and whether a route can carry one-way or two-way traffic. The dynamic roadmap generation module 205 also allows a user to define hazards. A hazard defined in the dynamic roadmap generation module 205 is defined according to its position in the geographical information systems database and a variable that defines the type of hazard. The dynamic roadmap generation module 205 also allows a user to define various zones, for example radii, around the hazard that represent various levels of threat.

The types of hazards that can be defined include mobile, but slow, heavy equipment such has shovels, bulldozers and material removal trucks, unstable slopes or surfaces, low points where water collects or bogs, high voltage power lines for delivering electricity to mining equipment, and areas where explosives are being used.

The dynamic roadmap generation module 205 also allows the user to define either static or mobile points of interest, for example, the locations of work sites or pieces of equipment.

Additionally, the dynamic roadmap generation module 205 also allows a user to import overhead imaging data, for example, imaging data generated by overhead satellites or aerial surveys. The dynamic roadmap generation module 205 allows such overhead imaging data to be oriented and scaled according to a coordinate system, for example, latitude and longitude, so that routes and hazards can be defined in relation to the overhead imaging data.

The central application 200 includes a remote position and attitude reception module 210. The remote position and attitude reception module receives data regarding the position, direction and speed of remote vehicles. Remote vehicles in a mining environment can include both light vehicles and slowly moving heavy equipment. The position, direction and speed of remote vehicles can be received directly by the remote position and attitude reception module 210, or can be calculated by the remote position and attitude reception module from base data, for example, the position of a remote vehicle over time. The position of the remote vehicle over time can be expressed, for example, as a trace or set of time varying latitude and longitude coordinates generated, for example, by a GPS receiver at the remote vehicle.

The central application 200 includes a transceiver module 215. The transceiver module 215 receives data from remote vehicles, for example, traces or sets of time varying latitude and longitude coordinates reflecting the positions of remote vehicles.

The central application 200 also includes a logging and tracking module 220. The logging and tracking module 220 includes a database that stores traces representing the path taken by remote vehicles in communication with the central application 200. The logging and tracking module's database can also include other information about the remote vehicles that is indexed to various points on the trace. For example, the logging and tracking module can store the speed at which a vehicle was moving as a function of time or position, the condition of the vehicle, for example, data generated by diagnostic application on board the remote vehicles, whether the vehicle has violated any rules associated with features defined by the dynamic roadmap generation system, for example, whether a vehicle has gotten too close to a hazard.

The central application 200 communicates remotely with one or more remote applications 230 over a communication link 225. The communication link 225 is any data transmission system capable of transmitting data from one or more mobile applications 230 to the central application 200. The communication link 225 can use any combination of wireless and wired data communication infrastructure known in the art. The communication link 225 can be implemented by, for example, a direct two-way radio data transmission link linking the individual vehicles to the central application. Alternatively, the communication link 225 can be a wireless data signal operating according to any of the various IEEE 802.11 standards to communicate with fixed transceivers distributed around the mining environment, which are in turn connected to a wired data network.

Figure 3:
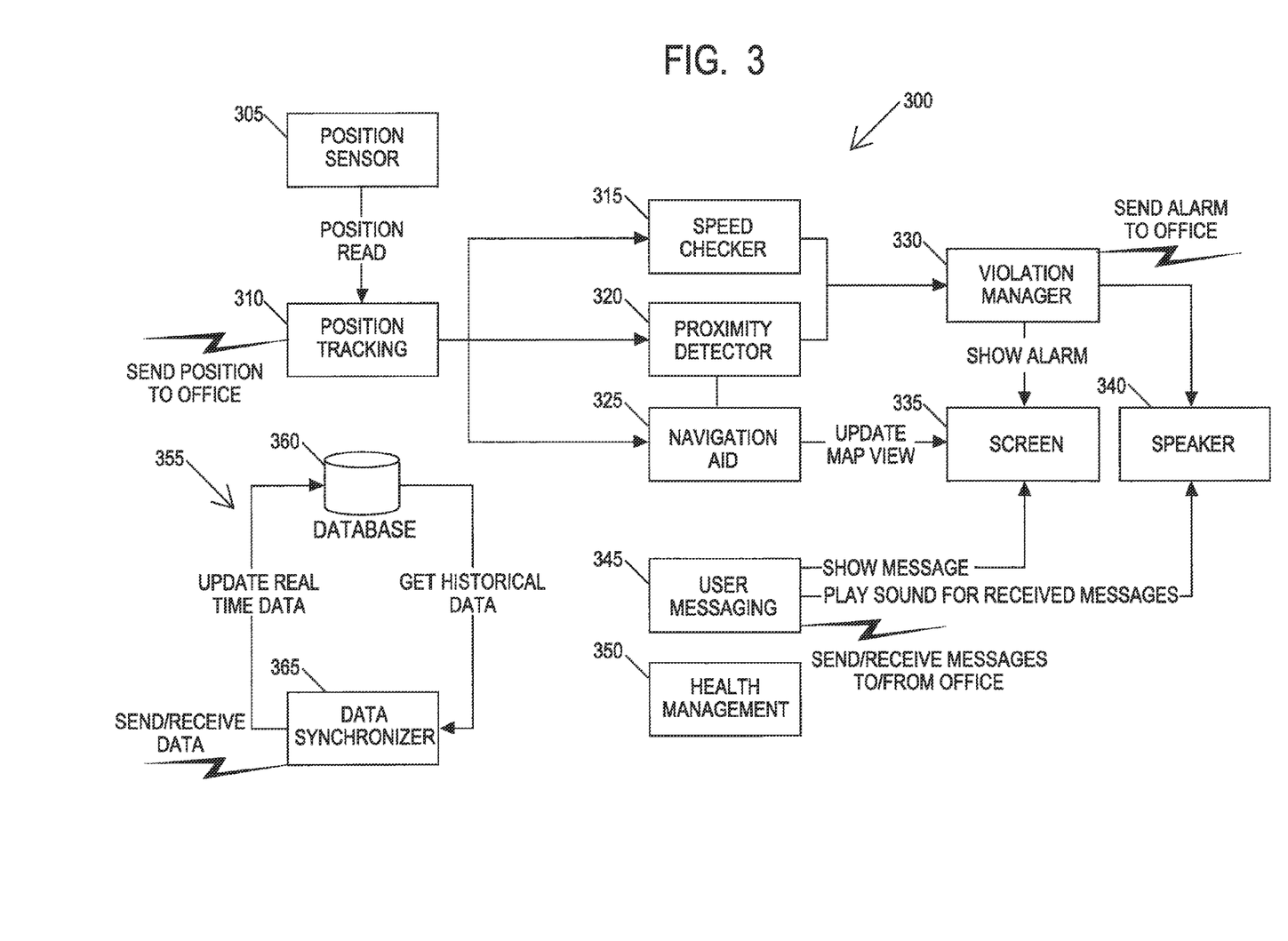
FIG. 3 shows a detailed schematic representation of a remote application according to the present invention.

FIG. 3 shows the operation of a remote application running on a remote vehicle according to the present invention. The remote application of FIG. 3 includes a position sensor 305. The position sensor 305 detects the position of the remote vehicle, for example, by triangulating the vehicle's position in relation to fixed satellites, such as is known in GPS related art. The position sensor 305 might also determine the position of the remote vehicle by other means such as by triangulating the vehicle's position in relation to terrestrial transmitters located in a mining environment. The position sensor 305 optionally can use a combination of methods or systems to determine position, for example, by determining a rough position using GPS and performing error correction by terrestrial references.

The position sensor 305 outputs data to a position tracker 310. The position tracker 310 receives information from a central application, not shown, regarding a defined roadmap system, and tracks the vehicle's position with respect to that roadmap system. The roadmap system, not shown, includes defined features such as acceptable routes, attributes of those routes such as speed limits and whether the route is one-way or two-way, the location of hazards, the distance from particular hazards that is permitted, and the positions of other vehicles. The position tracker 310 can be updated in real time from a central application, not shown, which allows the roadmap, route attributes, and hazards to be updated as they change.

The remote application 300 includes a number of modules that act on data received from the position tracker 310. A speed checker 315 checks the speed of the vehicle against the allowable speed for a particular area defined on the roadmap. The speed checker 315 can calculate the speed from GPS or other data received from the position sensor or might read the vehicle's speed directly from the vehicle. A proximity detector 320 checks the vehicles position against the location of objects defined in the roadmap. The vehicle's position is typically checked against objects such as, for example, defined hazards, other vehicles, areas that have been defined as out-of-bounds or not on a defined route, or areas that are on a defined route but that only permit a particular direction of travel.

Information from the speed tracker 315 and proximity detector 320 is passed to the violation manager 330. The violation manager 330 includes a rule set that compares the location and attitude of the vehicle with attributes defined in the roadmap and returns an indication if certain rules are violated. Rules within the violation manager 330 can optionally govern such conditions as whether the remote vehicle has violated a speed limit associated with a particular route, whether the vehicle is proceeding in the wrong direction along a particular route, whether the remote vehicle has left a designated route, entered an off-limits area, or neared a hazard to come too close to another vehicle. Rules included in the violation manager 330 need not be Boolean. The violation manager can, for example, maintain various distances around hazards and trigger different indications as the vehicle gets closer to the hazard. Similarly, the violation manager 330 can return different indications depending on how far off a designated road a vehicle has ventured.

Depending on the definition of the rule set of the violation manager 330, the remote application 300 can take varying actions when a rule is violated. When a rule is violated an indication can be sent from the remote vehicle to a different location, for example, a central application (not shown). When a vehicle comes too close to a predefined hazard, for example, a central office at the mine can be notified so that the event can be logged. The violation manager 330 can additionally or alternatively supply an audible alarm to a speaker 340 or a visual alarm to a screen 335 visible to the driver of the remote vehicle.

The remote application 300 optionally includes a navigation aid 325 that receives the position, direction and speed of the remote vehicle from the position tracker 310. The navigation aid 325 receives roadmap data generated by, for example, a central application (not shown) including a dynamic roadmap generation module 205, as described with respect to FIG. 2. The navigation aid 325 includes a representation of a roadmap system defined in a geographical information systems database. The representation of a roadmap system includes geographical features such as acceptable routes, route attributes, hazards, out-of-bounds areas and the location of points of interests, for example individual work sites or pieces of equipment. The navigation aid 325 optionally includes overhead imaging data generated, for example, by satellite or aerial photography that is scaled and oriented to be co-extensive with the representation of the roadmap system. The navigation aid 325 optionally includes a navigation application that calculates acceptable routes between points in the roadmap system.

The navigation aid 325 displays the location of the remote vehicle on the visual representation of the roadmap system, overplayed on overhead imaging data on the screen 335. A graphical user interface (GUI), not shown, allows a user to alter the scale and orientation of the visual representation of the roadmap system and plot acceptable routes between the current location of the remote vehicle and predefined points of interest.

The remote application 300 can optionally include a user messaging function 345 that alerts the user of messages, such as instant messages or electronic mail, relayed to remote application 300 from a central application not shown. When a user receives a message, audible alarms can be sent to the speaker 340 and visual alarms as well as a display of the message itself can be sent to the screen.

The remote application 300 may also optionally include a data storage module 355 that is updated from a central application not shown. For example, the remote application 300 may include a database 360 that stores roadmap data, overhead imaging data, or time varying data on a remote vehicle's position and/or condition. The database 360 can be periodically updated by the central application, not shown, through a Data Synchronizer 365.

The remote application along with any necessary data storage and communications hardware can be included in a variety of known devices, for example handheld personal data assistants (PDAs), laptop computers, or "smart" cellular telephones.

Figure 4:
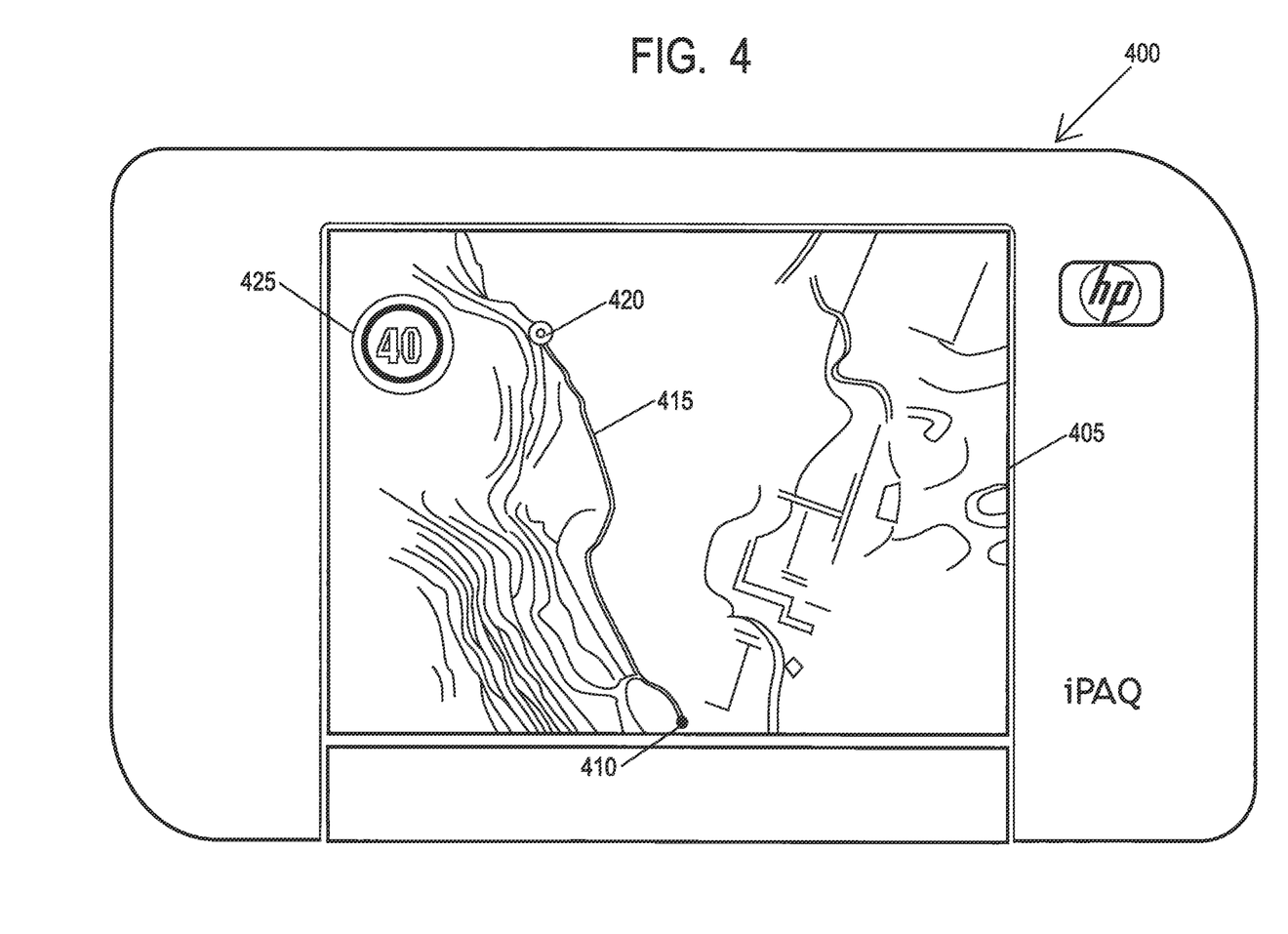
FIG. 4 shows a display of a device running a remote application according to the present invention.

Referring to FIG. 4, a personal data assistant (PDA) 400 is shown. The PDA 400 includes a remote application such as is described with respect to FIG. 3. The PDA includes a display screen 405 including an overhead perspective visual representation of a mine environment. The PDA screen 405 includes a representation of a predefined route 415 through the mine environment connecting a representation of a vehicle 410 with the representation of some point of interest 420. The PDA display screen 405 also optionally includes a speed limit indicator 425 that indicates the allowable speed for the route 415 and is optionally adapted to flash to provide a warning when the speed limit is neared or exceeded.

The invention has been described with regard to particular specific embodiments. Other embodiments and equivalents will be understood by those of skill in the art to be encompassed within the spirit of the disclosure and/or within the following claims.

What is claimed is:

1. A navigation and hazard avoidance system for a mining vehicle operating within a mining environment, comprising:
   a position tracker configured to receive a plurality of features and a plurality of zones defined around each of the features from a geographical information systems database, each of the plurality of zones defining a different threat level and including a different geographical volume;
   a navigation aid configured to display a current position of the mining vehicle with respect to the features; and
   a violation manager configured to:
     determine whether at least a portion of the mining vehicle falls within at least a first one of the plurality of zones defined around a first feature retrieved from the geographical information systems database, and
     when the at least the portion of the mining vehicle falls within the first one of the plurality of zones defined around the first feature, generate an alarm to a user of the mining vehicle.

2. The system of claim 1, wherein the mining vehicle includes at least one of a shovel, a bulldozer and a material removal truck.

3. The system of claim 1, wherein the position tracker is configured to receive overhead imaging data corresponding to a position of the plurality of features.

4. The system of claim 3, wherein the navigation aid is configured to display the overhead imaging data.

5. The system of claim 1, wherein, when the current position of the mining vehicle falls within one of the plurality of zones defining a different threat level defined around the first feature, the violation manager is configured to return an indication having a type, the type of the indication being determined by a distance between the mining vehicle and the first feature.

6. The system of claim 1, wherein the features from the geographical information systems database include at least one of routes, route attributes, hazards, and points of interest.

7. The system of claim 1, including a position sensor adapted to calculate the current position of the mining vehicle using Global Positioning System satellites.

8. The system of claim 1, wherein the features from the geographical information systems database include routes and route speed limits and the violation manager is configured to determine whether the mining vehicle is near or has exceeded a route speed limit.

9. A method for navigation and hazard avoidance in a mining environment, comprising:
   receiving a plurality of features and a plurality of zones defined around each of the features from a geographical information systems database, each of the plurality of zones defining a different threat level and including a different geographical volume;
   displaying a current position of a mining vehicle with respect to the features;
   determining whether at least a portion of the mining vehicle falls within at least a first one of the plurality of zones defined around a first feature retrieved from the geographical information systems database; and
   when the at least a portion of the mining vehicle falls within the first one of the plurality of zones defined around the first feature, generating an alarm to a user of the mining vehicle.

10. The method of claim 9, wherein the mining vehicle includes at least one of a shovel, a bulldozer and a material removal truck.

11. The method of claim 9, including receiving overhead imaging data corresponding to a position of the plurality of features.

12. The method of claim 11, including displaying the overhead imaging data.

13. The method of claim 9, including, when the current position of the mining vehicle falls within one of the plurality of zones defining a different threat level defined around the first feature, returning an indication having a type, the type of the indication being determined by a distance between the mining vehicle and the first feature.

14. The method of claim 9, wherein the features from the geographical information systems database include at least one of routes, route attributes, hazards, and points of interest.

15. A computer readable medium having instructions operable to define a navigation and hazard avoidance system for a mining vehicle operating within a mining environment, comprising:
   a position tracker configured to receive a plurality of features and a plurality of zones defined around each of the features from a geographical information systems database, each of the plurality of zones defining a different threat level and including a different geographical volume;
   a navigation aid configured to display a current position of the mining vehicle with respect to the features; and
   a violation manager configured to:
     determine whether at least a portion of the mining vehicle falls within at least a first one of the plurality of zones defined around a first feature retrieved from the geographical information systems database, and when the at least the portion of the mining vehicle falls within the first one of the plurality of zones defined around the first feature, generate an alarm to a user of the mining vehicle.

16. The computer readable medium of claim 15, wherein the mining vehicle includes at least one of a shovel, a bulldozer and a material removal truck.

17. The computer readable medium of claim 15, wherein the position tracker is configured to receive overhead imaging data corresponding to a position of the plurality of features.

18. The computer readable medium of claim 17, wherein the navigation aid is configured to display the overhead imaging data.

* * * * *